US010810699B2

(12) United States Patent
Komeichi et al.

(10) Patent No.: US 10,810,699 B2
(45) Date of Patent: Oct. 20, 2020

(54) POINT CLOUD DATA PROCESSING DEVICE, POINT CLOUD DATA PROCESSING METHOD, AND POINT CLOUD DATA PROCESSING PROGRAM

(71) Applicant: TOPCON CORPORATION, Itabashi-ku, Tokyo (JP)

(72) Inventors: Takahiro Komeichi, Tokyo (JP); Naoki Morikawa, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 341 days.

(21) Appl. No.: 15/905,887

(22) Filed: Feb. 27, 2018

(65) Prior Publication Data
US 2018/0253821 A1    Sep. 6, 2018

(30) Foreign Application Priority Data

Mar. 2, 2017  (JP) ................................. 2017-039043

(51) Int. Cl.
*G06T 19/20* (2011.01)
*G06T 3/00* (2006.01)
(Continued)

(52) U.S. Cl.
CPC .............. *G06T 3/0081* (2013.01); *G06T 7/30* (2017.01); *G06T 7/33* (2017.01); *G06T 19/20* (2013.01);
(Continued)

(58) Field of Classification Search
CPC ........... G06T 3/0081; G06T 7/30; G06T 7/33; G06T 19/20; G06T 2219/2004;
(Continued)

(56) References Cited

U.S. PATENT DOCUMENTS 7,969,558 B2  6/2011  Hall
8,767,190 B2  7/2014  Hall
(Continued)

FOREIGN PATENT DOCUMENTS

JP    2008-268004 A    11/2008
JP    2010-151682 A    7/2010
(Continued)

OTHER PUBLICATIONS

Tat-Jun Chin et al., "Fast Rotation Search for Real-Time Interactive Point Cloud Registration," Interactive 3D Graphics and Games, ACM, 2 Penn Plaza, Suite 701 New York NY 10121-0701 USA, Mar. 14, 2014, pp. 55-62.
(Continued)

*Primary Examiner* — Phuoc Tran
(74) *Attorney, Agent, or Firm* — Chiesa Shahinian & Giantomasi PC

(57) ABSTRACT

Working efficiency in position matching of multiple point cloud data displayed on a display is improved. A point cloud data processing device includes a highlight controlling part. In a condition in which a first point cloud containing multiple markers for position matching and a second point cloud containing multiple markers for position matching are displayed on a display, when a marker of one of the first point cloud and the second point cloud is specified, the highlight controlling part highlights a corresponding marker of the other point cloud.

8 Claims, 13 Drawing Sheets

(51) Int. Cl.
*G06T 7/33* (2017.01)
*G06T 7/30* (2017.01)

(52) U.S. Cl.
CPC ............... *G06T 2207/10028* (2013.01); *G06T 2210/56* (2013.01); *G06T 2219/2004* (2013.01); *G06T 2219/2016* (2013.01)

(58) Field of Classification Search
CPC ....... G06T 2207/10028; G06T 2210/56; G06T 2219/2016
See application file for complete search history.

(56) References Cited

U.S. PATENT DOCUMENTS

| | | | |
|---|---|---|---|
| 9,208,607 B2 * | 12/2015 | Chu | G06T 17/00 |
| 9,875,546 B1 * | 1/2018 | Bhole | G06F 1/163 |
| 2009/0241358 A1 | 10/2009 | Ohtomo et al. | |
| 2010/0256940 A1 | 10/2010 | Ogawa et al. | |
| 2012/0218546 A1 | 8/2012 | Ogawa et al. | |
| 2012/0256916 A1 | 10/2012 | Kitamura et al. | |
| 2013/0236107 A1 | 9/2013 | Fukaya et al. | |

FOREIGN PATENT DOCUMENTS

| | | |
|---|---|---|
| JP | 2012-230594 A | 11/2012 |
| JP | 2013-178656 A | 9/2013 |
| JP | 2013-186816 A | 9/2013 |
| WO | 2011070927 A1 | 6/2011 |

OTHER PUBLICATIONS

Heejeong Lee et al., "Registering 3D Scanned Point Cloud Using Markers International Joint Conference 2006," SICE-ICCAS 2006 International Joint Conferene, IEEE, Piscataway, NJ, USA Oct. 1, 200, 5 pgs.

Gary K.L. Tam et al., "Registration of 3D Point Clouds and Meshes: A Survey from Rigid to Nonrigid," IEEE Transactions on Visualization and Computer Graphics, IEEE Service Center, Los Alamitos, CA, US, vol. 19, No. 7, Jul. 1, 2013, 19 pgs.

Transue Shane et al., "Intuitive Alignment of Point-clouds with Painting-Based Feature Correspondence," Image Computing and Computer-Assisted Intervention—MICCAI 2015; 18th International Conference, Dec. 8, 2014, 11 pgs.

Eric A. Bier, "Snap-Dragging in Three Dimensions", Proceedings Symposium on Interactive 3D Graphics, New York, NY, US, vol. 24, No. 2, Mar. 25, 1990, 12 pgs.

Extended Search Report dated Jul. 12, 2018, in connection with European Patent Application No. 18157061.5, 11 pgs.

* cited by examiner

Fig. 1
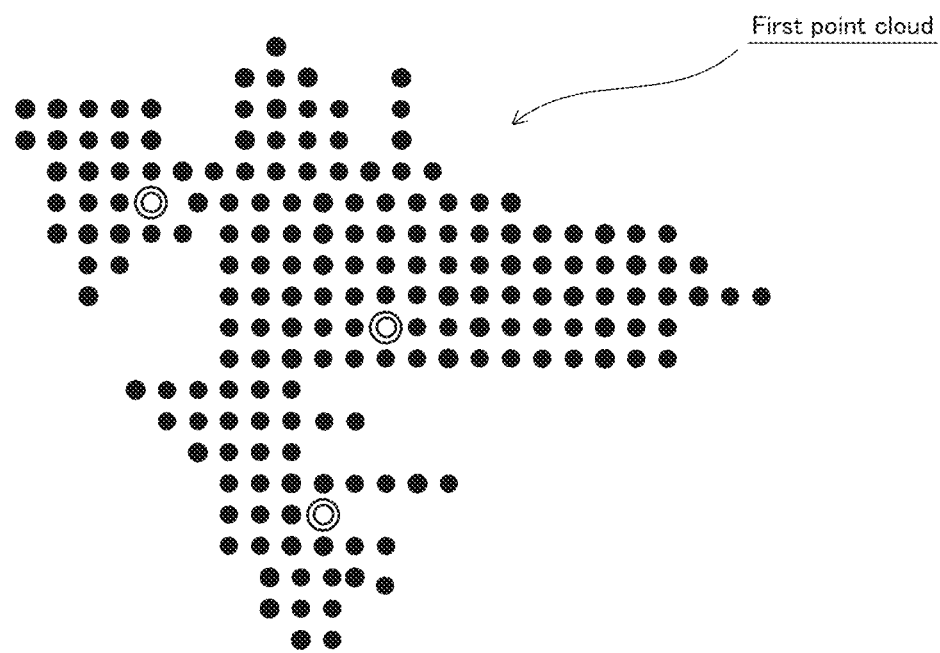
First point cloud
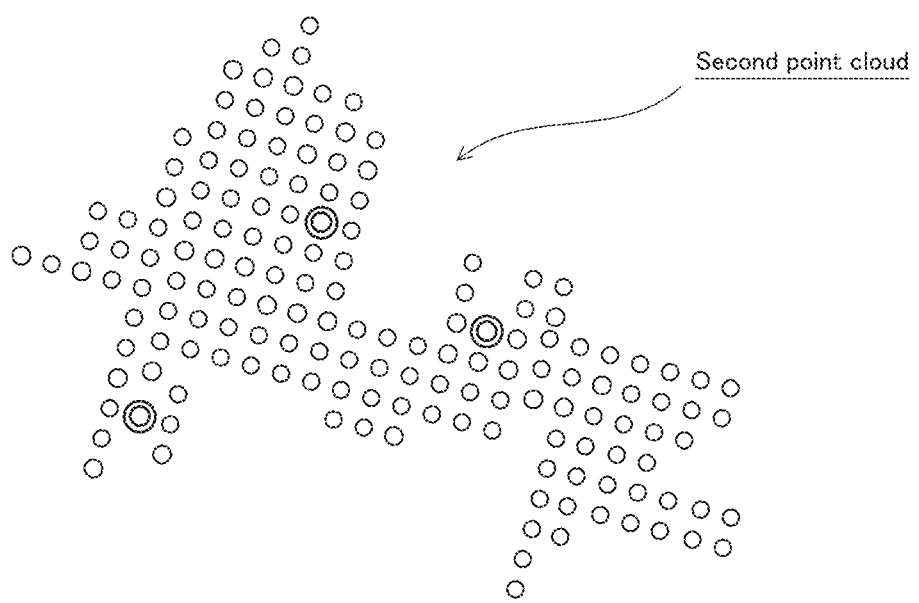
Second point cloud

Fig. 2
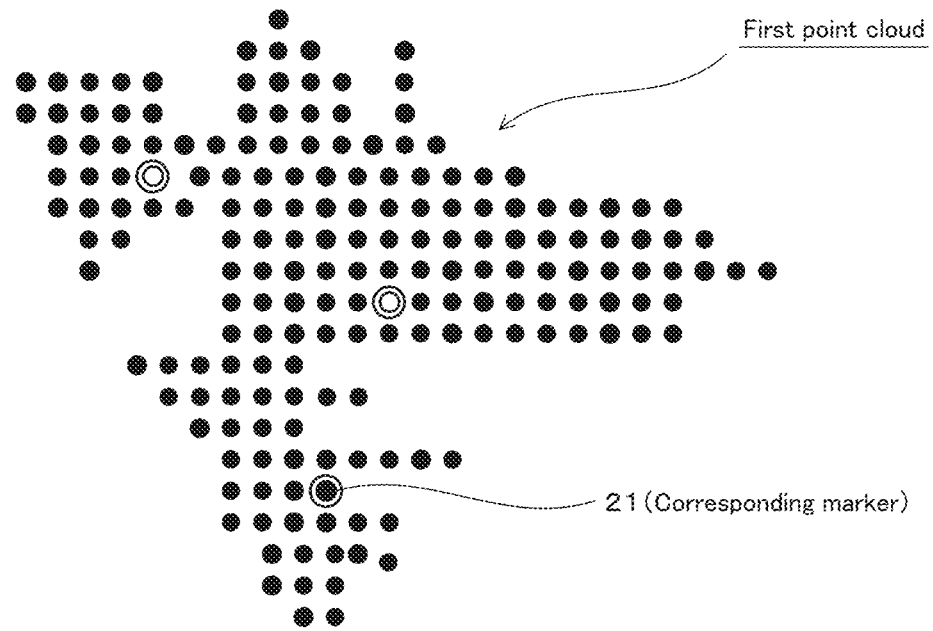
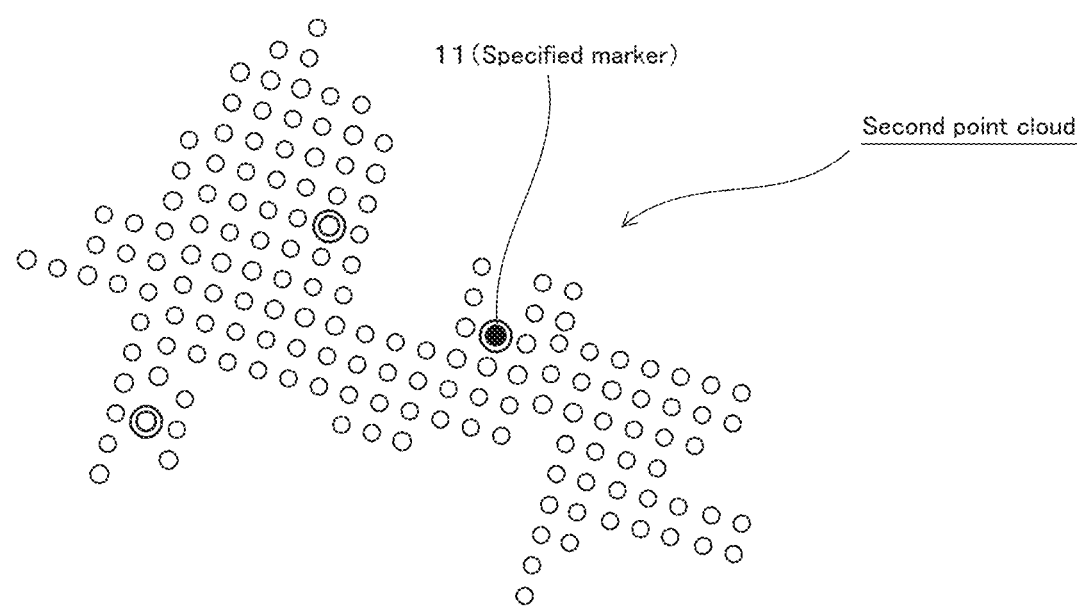

Move second point cloud parallel to first point cloud

Markers 11 and 21 are made to coincide

Positions of first point cloud and second point cloud are matched with each other

POINT CLOUD DATA PROCESSING DEVICE, POINT CLOUD DATA PROCESSING METHOD, AND POINT CLOUD DATA PROCESSING PROGRAM

CROSS-REFERENCE TO RELATED APPLICATION

This application is based upon and claims benefit of priority from Japanese Patent Application No. 2017-039043, filed Mar. 2, 2017, the entire contents of which are incorporated herein by reference

TECHNICAL FIELD

The present invention relates to a point cloud data processing technique.

BACKGROUND

Point cloud data that are obtained by using a laser scanner or by stereophotogrammetry are publicly known (for example, refer to WO 2011/070927 and Japanese Unexamined Patent Application Laid-Open No. 2012-230594). The point cloud data represents an object in the form of a set of points and contains three-dimensional coordinates of each of the points. The point cloud data can be obtained by calculating three-dimensional coordinates of each feature point that is extracted from measurement result by a three-dimensional laser scanner or from a stereoscopic photograph image, based on the principle of stereophotogrammetry.

When point cloud data is three-dimensionally displayed on a display of a PC or of another device, a three-dimensional shape of an object to be measured is displayed by point clouds (set of points) of the object. The point cloud data is typically used for obtaining a three-dimensional model therefrom. The three-dimensional model represents outline data of an object on a display and has a high affinity to three-dimensional data that can be processed by CAD software.

Point cloud data may be difficult to obtain from hidden portions as seen from one point of view. This phenomenon is called "occlusion". Thus, to generate a three-dimensional model without occlusion, point clouds are obtained from multiple points of view and are synthesized. In this case, the point clouds that are obtained from different points of view must be matched with each other.

In this matching operation, an operator operates a personal computer (PC) or another device to determine each correspondence relationship between points of two point clouds. Specifically, an operator specifies a specific point of a first point cloud and a corresponding specific point of a second point cloud by manual operation, and this operation is performed on multiple points.

SUMMARY OF THE EMBODIMENTS

In this matching operation, the point clouds are moved in parallel and are rotated. The workability of this operation greatly affects working efficiency. An object of the present invention is to provide a technique for improving working efficiency in position matching of multiple point cloud data displayed on a display.

A first aspect of the present invention provides a point cloud data processing device including a highlight controlling part. In a condition in which a first point cloud containing multiple markers for position matching and a second point cloud containing multiple markers for position matching are displayed on a display, when one of the multiple markers of one of the first point cloud and the second point cloud is specified as a first marker, the highlight controlling part highlights a corresponding marker among the multiple markers of the other point cloud as a second marker.

According to a second aspect of the present invention, in the first aspect of the present invention, the point cloud data processing device may further include a coinciding processing part. When a distance between the first marker and the second marker is a predetermined value or less on the display, the coinciding processing part executes processing for making the first marker and the second marker coincide with each other on the display.

According to a third aspect of the present invention, in the first or the second aspect of the present invention, the point cloud data processing device may further include a rotation display controlling part. The rotation display controlling part controls, at a stage in which the first marker and the second marker are made to coincide with each other on the display, rotation of the first point cloud or the second point cloud around the first marker or the second marker on the display.

According to a fourth aspect of the present invention, in any one of the first to the third aspects of the present invention, the point cloud data processing device may further include a corresponding marker calculating part. When a marker is specified among the multiple markers of one of the first point cloud and the second point cloud, the corresponding marker calculating part calculates a corresponding marker among the multiple markers of the other point cloud. The corresponding marker calculating part identifies the corresponding marker on the basis of a relative positional relationship between the specified marker and at least one of the multiple markers of the one of the first point cloud and the second point cloud.

According to a fifth aspect of the present invention, in the fourth aspect of the present invention, the relative positional relationship may be determined by using a figure having the specified marker and the at least one of the multiple markers of the one of the first point cloud and the second point cloud as apexes. According to a sixth aspect of the present invention, in the fourth or the fifth aspect of the present invention, the relative positional relationship may be determined by a distance between the specified marker and the at least one of the multiple markers of the one of the first point cloud and the second point cloud or by both the distance and a direction of the specified marker.

According to a seventh aspect of the present invention, in any one of the first to the sixth aspects of the present invention, the point cloud data processing device may further include a separation display controlling part that displays the first point cloud and the second point cloud separately from each other.

An eighth aspect of the present invention provides a point cloud data processing method including, in a condition in which a first point cloud containing multiple markers for position matching and a second point cloud containing multiple markers for position matching are displayed on a display, when one of the multiple markers of one of the first point cloud and the second point cloud is specified, highlighting a corresponding marker among the multiple markers of the other point cloud.

A ninth aspect of the present invention provides a non-transitory computer recording medium storing computer executable instructions that, when executed by a computer processor, cause the computer processor to operate as a highlight controlling part. In a condition in which a first point cloud containing multiple markers for position matching and a second point cloud containing multiple markers for position matching are displayed on a display, when one of the multiple markers of one of the first point cloud and the second point cloud is specified, the highlight controlling part highlights a corresponding marker among the multiple markers of the other point cloud.

The present invention enables improving working efficiency in position matching of multiple point cloud data displayed on a display.

BRIEF DESCRIPTION OF DRAWINGS

FIG. 1 is an explanatory diagram of an embodiment.
FIG. 2 is an explanatory diagram of the embodiment.

DETAILED DESCRIPTION OF THE EMBODIMENTS

Figure 3:
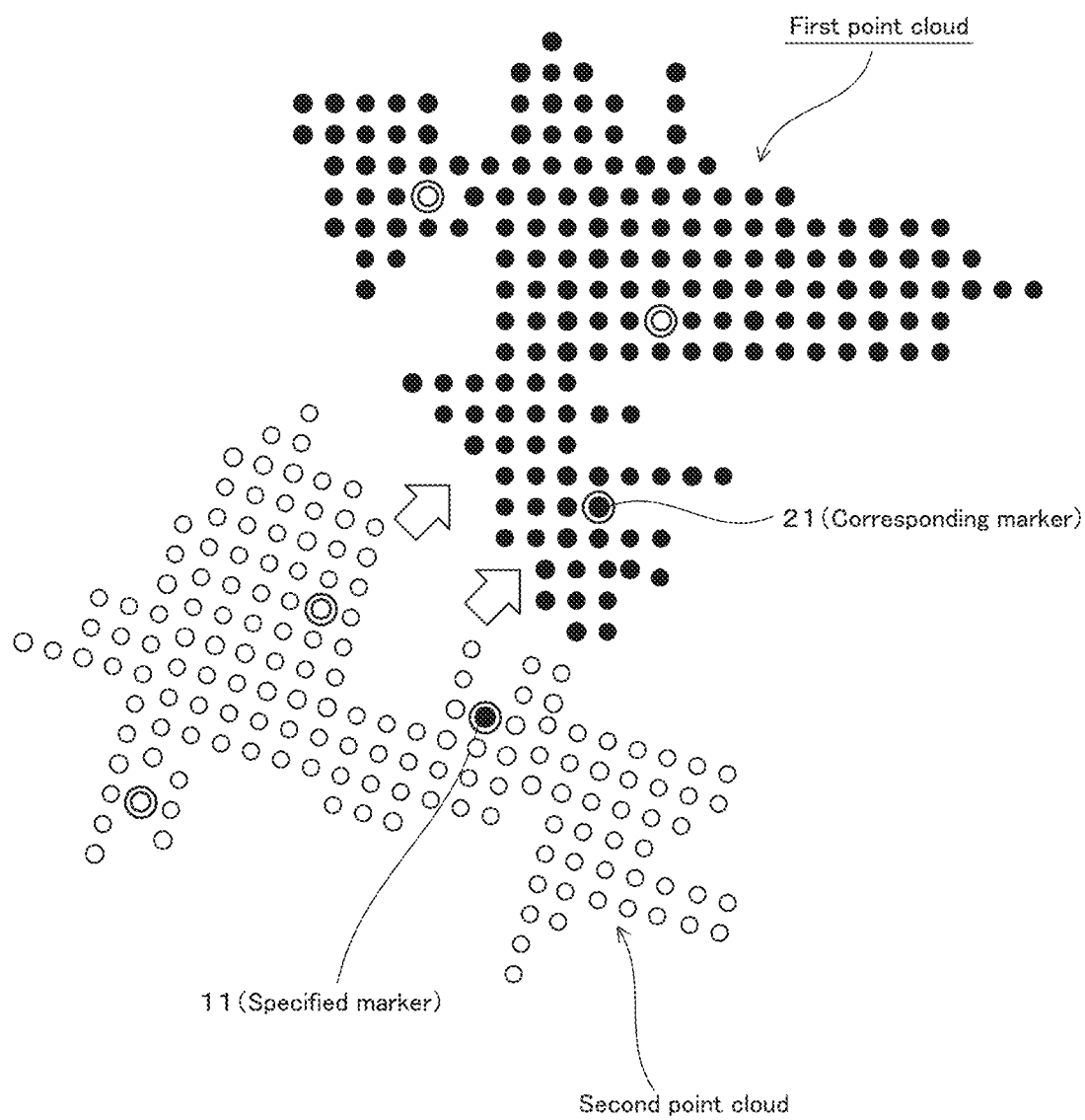
FIG. 3 is an explanatory diagram of the embodiment.

FIG. 1 shows two point clouds that were obtained from different points of view, displayed on a display, such as a liquid crystal display, of a personal computer (PC) or of another device. The two point clouds shown in FIG. 1 are obtained by laser-scanning an object to be measured from two different points of view so that the scanning areas overlap.

The two point clouds as viewed downwardly from a vertical direction are shown in FIG. 1. In the state shown in FIG. 1, the two point clouds are displayed separately from each other to facilitate understanding of the relationship between the two point clouds. In displaying in a practical case, a first point cloud and a second point cloud may be differentiated in the color of the points to facilitate discrimination therebetween. In addition, FIG. 1 shows the first point cloud and the second point cloud of which the display scales are made consistent.

The points, each indicated by a double circle in FIG. 1, are reflective points using dedicated targets. Hereinafter, the reflective points each indicated by the double circle are called "markers". The three markers are the same in the two point clouds and are used to match the positions of the first point cloud and the second point cloud with each other. Although three markers are prepared in this embodiment, a greater number of markers may also be used.

The following describes an example of a procedure for matching (matching positions of) two point clouds displayed on a display of a PC as shown in FIG. 1. Pieces of hardware for executing the following processing will be described later. First, as shown in FIG. 1, a first point cloud and a second point cloud as viewed downwardly from a vertical direction are displayed on a display separately from each other so as not to be superposed one on another.

Then, a user operates the PC and specifies one of the three markers of one of the point clouds. In this embodiment, one of the three markers of the second point cloud is specified. After being specified, the marker is highlighted so as to be easily visually recognized. Here, the user specifies a marker 11 (refer to FIG. 2), and the marker 11 is highlighted by coloring the center of its double circle black.

Next, identification information of the specified marker 11 is obtained. Thereafter, a corresponding marker 21 of the first point cloud is identified (refer to FIG. 2). The placed location of each of the markers is preliminarily identified by using a total station or another device and is associated with identification data such as a number. Naturally, since the markers of the first point cloud are the same as in the second point cloud, when the marker 11 of the second point cloud is identified, the corresponding marker 21 of the first point cloud is also identified.

In some cases, there may exist a marker that can be scanned by one laser scanner, but cannot be scanned by another laser scanner due to the difference in the point of view. In such cases, not all of the markers correspond between the first point cloud and the second point cloud. The example in FIG. 1 is a case in which common markers are detected between the first point cloud and the second point cloud.

There may be cases in which predetermined identification data is not obtained. In one example, obtained point cloud data may contain a marker that can be discriminated from other points as a dedicated target, but location information and identification information of this marker are not known. In another example, in a case in which point cloud data is obtained by using a laser scanner in a construction site and is processed in a distant office or another place at a later date by an operator different from the operator using the laser scanner, the above situation may occur.

In such cases, a relative positional relationship of a target marker with other markers is used as identification information of the target marker. An example of using three markers as shown in FIG. 1 is considered. In this case, a triangle using the three markers as apexes is generated. Typically, the triangle is not a regular triangle or an isosceles triangle, but has a distorted asymmetric shape. That is, a first triangle having three markers as apexes in the first point cloud and a second triangle having three markers as apexes in the second point cloud are generated.

In the case shown in FIG. 1, the three markers are the same in the first point cloud and the second point cloud. Because of this relationship, the first triangle and the second triangle coincide with each other, and each of the correspondence relationships between the apexes of the first triangle and the second triangle is determined. As a result, as shown in FIG. 2, the marker 21 of the first point cloud corresponding to the marker 11 specified in the second point cloud is identified.

In the case of having four or more markers, a polygon having these markers as apexes is generated in each of the two point clouds. Then, these polygons are compared to each other to determine each of the correspondence relationships between the apexes of the two point clouds, and a marker in the other point cloud corresponding to a marker specified in one of the two point clouds is identified. Alternatively, since each point of two point clouds is distributed in a three-dimensional space, a polyhedron having apexes at positions of four or more markers is generated with respect to each of a first point cloud and a second point cloud. Then, the correspondence relationship between these polyhedrons of the first point cloud and the second point cloud is examined to identify a marker in the other point cloud corresponding to a marker specified in one of the first point cloud and the second point cloud.

In the case of having markers that do not correspond to each other between two point clouds, a polygon or a polyhedron is generated in each of the two point clouds by using some markers in the respective two point clouds, and polygons or polyhedrons coinciding with each other between the two point clouds are searched for. Then, when polygons or polyhedrons that coincide with each other is found, a marker in the other point cloud corresponding to a marker specified in one of the two point clouds is identified.

As a result, as shown in FIG. 2, the marker 21 of the first point cloud corresponding to the marker 11 specified in the second point cloud is identified. FIG. 2 shows a case in which the corresponding marker 21 of the first point cloud is also highlighted in the same way as in the specified marker 11 of the second point cloud. The highlighting of the marker 21 may be performed at a stage in which the distance between the markers 11 and 21 becomes a predetermined value or less.

After the state shown in FIG. 2 is obtained, the user uses a graphical user interface (GUI) of the PC to move the second point cloud to the first point cloud so as to be close to each other on the display (refer to FIG. 3). At this time, at a stage in which the distance between the corresponding two markers (the marker 11 of the second point cloud specified by the user and the corresponding marker 21 of the first point cloud) becomes a predetermined value or less on the display, the two markers are forced to coincide with each other on the display. This condition is shown in FIG. 4.

This processing for making these markers coincide with each other on the display is performed by forcing one marker to be moved to the other marker or by bringing the two markers close to each other.

Figure 4:
FIG. 4 is an explanatory diagram of the embodiment.

The symbol 30 in FIG. 4 represents a superposed marker constituted of the first point cloud and the second point cloud by making the markers 11 and 21 coincide with each other. In this state, at least one of the point clouds is set to be rotatable around the superposed marker 30. The rotation is operated by the user.

Figure 5:
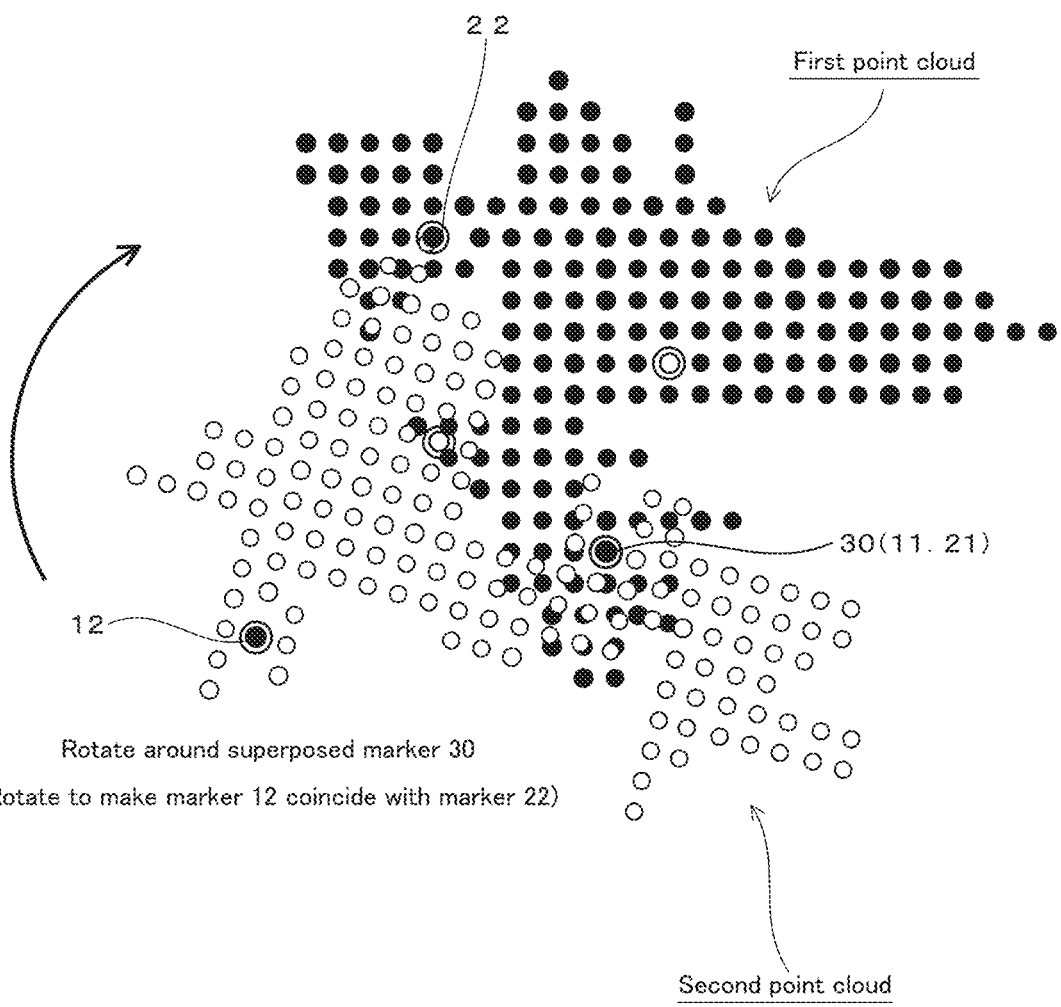
FIG. 5 is an explanatory diagram of the embodiment.

Hereinafter, the operation of the rotation is described with reference to FIG. 5. In this operation, a second marker 12 is specified from among the markers in the second point cloud by the user, for example, by clicking a left button of a mouse. The specified marker 12 is highlighted as shown in FIG. 5. When the user moves the marker 12 by using the GUI of the PC, the entirety of the second point cloud is rotated around the superposed marker 30 while having an axis in a direction vertical to the display, that is, a vertical direction of the point cloud. FIG. 5 shows a situation in which the second point cloud is rotated in a clockwise direction.

At this time, a marker 22 of the first point cloud corresponding to the marker 12 is identified and is highlighted on the display. The processing relating to determination of the correspondence relationship is the same as in the case of determining the correspondence relationship between the markers 11 and 12.

As shown in FIG. 5, as the second point cloud is rotated around the superposed marker 30 in the clockwise direction, the markers 12 and 22 come close to each other. Then, at a stage in which the distance between the markers 12 and 22 on the display becomes a predetermined value or less, the markers 12 and 22 are made to coincide on the display. This processing is performed by rotating the second point cloud by force so that the markers 12 and 22 coincide on the display.

Figure 6:
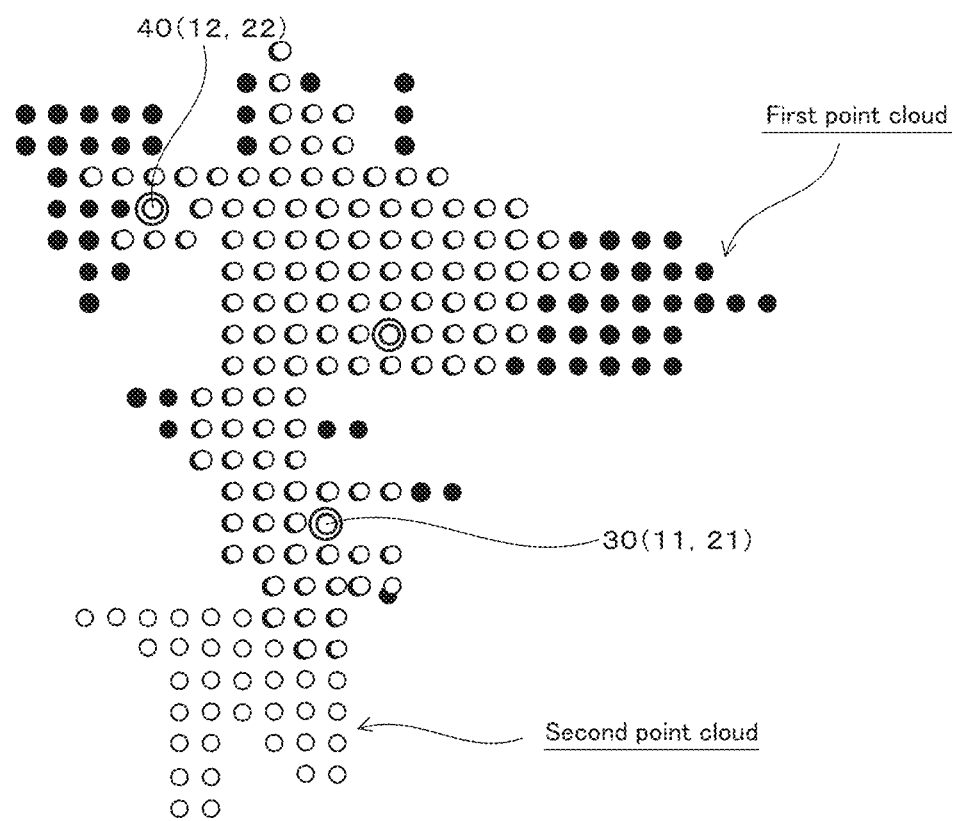
FIG. 6 is an explanatory diagram of the embodiment.

As a result of the processing, the markers 12 and 22 are also superposed one on another while the markers 11 and 21 are already superposed one on another, and the state shown in FIG. 6 is obtained. The markers 12 and 22 that are superposed one on another provide a superposed marker 40. As known from the case of using the superposed markers 30 and 40, when two pairs of the markers (pair of the markers 11 and 21 and pair of the markers 12 and 22) are respectively made to coincide with each other on the display, the first point cloud and the second point cloud are made to coincide with each other accordingly.

The points other than the markers may not coincide with each other in the first point cloud and in the second point cloud. There may be a point that can be viewed from a point of view for obtaining the first point cloud, but cannot be viewed from a point of view for obtaining the second point cloud, and vice versa. Thus, as shown in FIG. 6, areas that do not correspond with each other may exist.

As described above, the positions of the first point cloud and the second point cloud as shown in FIG. 1 are matched with each other on the display, and thus, the first point cloud and the second point cloud are synthesized. The positions of the two point clouds are matched with each other by easy operation including highlighting of the markers 11 and 21, automatic bringing of the markers 11 and 12 close to each other (forced coinciding), setting for allowing rotation around the superposed marker 30, and automatic bringing of the markers 12 and 22 close to each other while rotating (forced coinciding).

In a case in which predetermined identification information of markers of the first point cloud and the second point cloud are not available, a polygon or a polyhedron having the markers as apexes is generated in each of the two point clouds. Then, the correspondence relationship between the polygons or the polyhedrons of the two point clouds is examined, whereby the correspondence relationship between corresponding markers of the two point clouds is determined.

Figure 7:
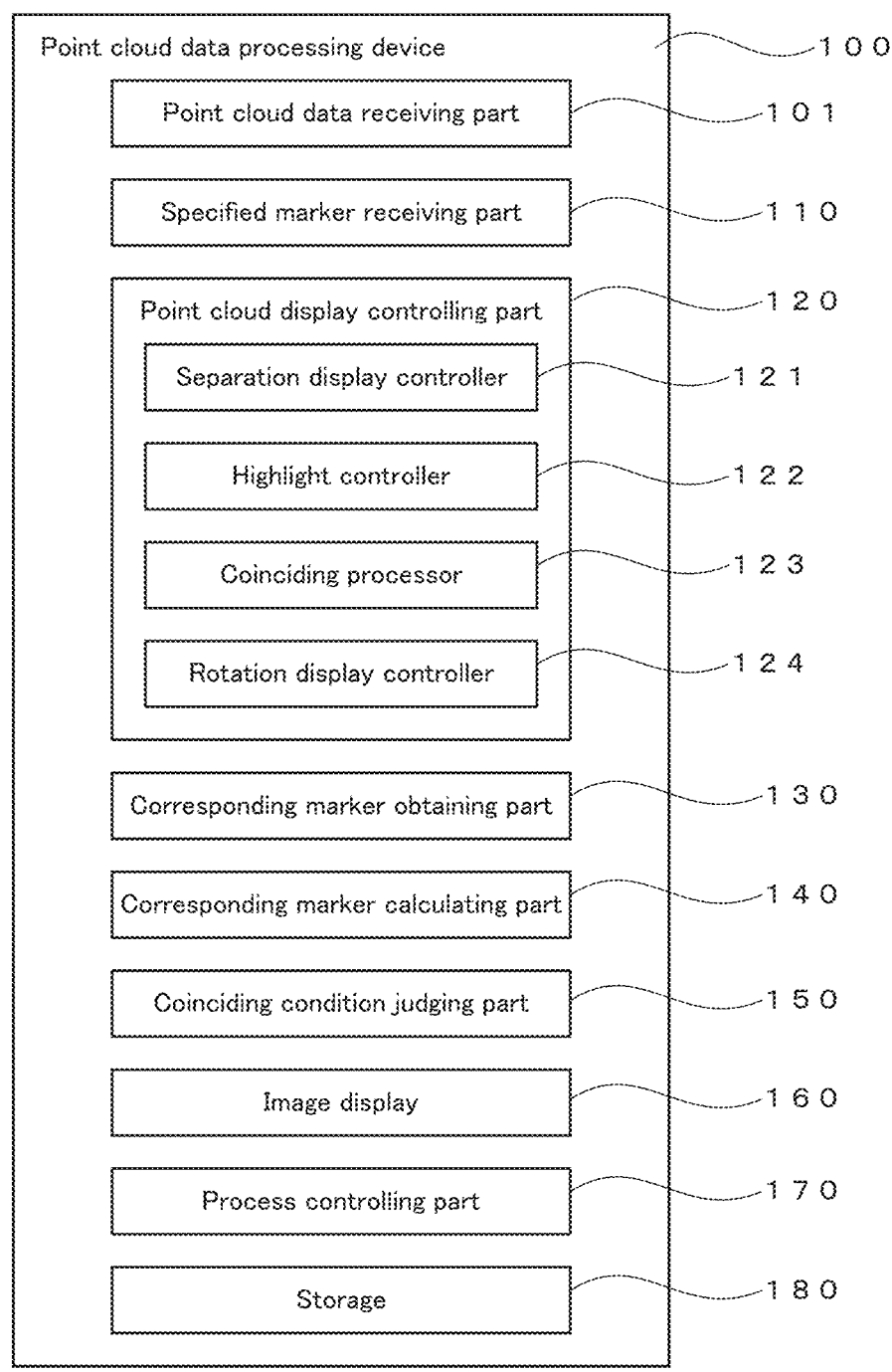
FIG. 7 is a block diagram of an embodiment.

FIG. 7 shows a point cloud data processing device 100. The point cloud data processing device 100 is used for executing the processing relating to the operation shown in FIGS. 1 to 6. The point cloud data processing device 100 is constituted by using a commercially available personal computer (PC). The point cloud data processing device 100 is implemented by installing application software that executes the functions shown in the drawings, in the PC and activating the application software.

When a PC is used, each functional part shown in FIG. 7 is constructed by software. A part or all of functional parts shown in FIG. 7 may be respectively constructed of dedicated arithmetic circuits. A functional part constructed of software and a functional part composed of a dedicated arithmetic circuit may be used together. For example, each of the functional parts shown in the drawing may be constructed of an electronic circuit such as a central processing unit (CPU), an application specific integrated circuit (ASIC), or a programmable logic device (PLD) such as a field programmable gate array (FPGA).

Whether each of the functional parts is to be constructed of dedicated hardware or is to be constructed of software so that programs are executed by a CPU is selected in consideration of necessary operating speed, cost, amount of electricity consumed, and other factors. Constructing the functional part by dedicated hardware and constructing the functional part by software differ from each other, as described above, but are equivalent to each other from the viewpoint of obtaining a specific function.

The point cloud data processing device 100 shown in FIG. 7 includes a point cloud data receiving part 101, a specified marker receiving part 110, a point cloud display controlling part 120, a corresponding marker obtaining part 130, a corresponding marker calculating part 140, a coinciding condition judging part 150, an image display 160, a process controlling part 170, and a storage 180. The point cloud display controlling part 120 includes a separation display controller 121, a highlight controller 122, a coinciding processor 123, and a rotation display controller 124.

The point cloud data receiving part 101 receives point cloud data obtained by using a laser scanner. Details of such a laser scanner may be found in Japanese Unexamined Patent Applications Laid-Open Nos. 2010-151682 and 2008-268004, and U.S. Pat. Nos. 8,767,190 and 7,969,558. Point cloud data generated on the basis of stereoscopic photograph images may also be used. The technique relating to generation of point cloud data may be found in Japanese Unexamined Patent Applications Laid-Open Nos. 2013-186816 and 2013-178656, for example. The specified marker receiving part 110 receives information of a marker specified by a user. For example, when a user specifies the marker 11 in FIG. 2 by using a GUI of a PC, this information is received by the specified marker receiving part 110.

The point cloud display controlling part 120 controls display of a point cloud displayed on the image display 160. An example of the image display 160 includes a liquid crystal display. For example, the control of the point clouds displayed on a display shown in FIGS. 1 to 6 is performed by the point cloud display controlling part 120.

The separation display controller 121 separates two point clouds on the display as shown in FIG. 1. The two point clouds are displayed so as not to overlap with each other as much as possible to facilitate operation of a user relating to the processing shown in FIGS. 2 to 6. The highlight controller 122 highlights the displayed marker specified by a user. The highlighting may be performed by displaying a black point as shown in FIG. 2, flashing, changing the shape of the displayed marker into a shape different from those of other markers, or other means. For example, a square shape of a displayed marker may be changed into a triangle shape.

When the marker of one of the point clouds specified by the user comes close to a marker of the other point cloud corresponding to the specified marker on the display, at a stage in which the distance between these markers becomes a predetermined value or less, the coinciding processor 123 forces these markers to coincide.

In an exemplary case shown in FIG. 3, when the user performs an operation to make the second point cloud be close to the first point cloud on the display, at a stage in which the distance between the markers 11 and 21 is a threshold value or less, the coinciding processor 123 forces the second point cloud on the display to move to make the markers 11 and 21 coincide on the display.

In another exemplary case shown in FIG. 5, when the user operates rotation of the second point cloud around the superposed marker 30, at a stage in which the distance between the markers 12 and 22 becomes a threshold value or less on the display, the coinciding processor 123 forces the second point cloud to rotate to make the markers 12 and 22 be superposed on the display.

The rotation display controller 124 controls to enable rotation operation for rotating the second point cloud around a rotation axis in the vertical direction on the display in the state shown in FIG. 4. That is, as shown in FIG. 5, when the marker 12 is specified, and operation for moving the marker 12 on the display is performed, the rotation display controller 124 controls rotation of the second point cloud around the superposed marker 30 on the display.

The corresponding marker obtaining part 130 obtains a marker of the other point cloud corresponding to a marker specified in one of the point clouds. A corresponding marker can be obtained by each of two methods. In a first method, identification information such as a number that is associated with every marker is retrieved from a database and is used to obtain a corresponding marker from among the other point cloud. In this method, the identification information of each marker is preliminarily obtained and is associated with each marker in a database.

A second method is performed when the identification information of the marker is not prepared. In this case, a polygon or a polyhedron having each marker as an apex is generated in each of the point clouds as described above. Then, the similarity or the correspondence relationship between the polygons or the polyhedrons of the point clouds is used to determine a marker in the other point cloud corresponding to a marker specified in the one of the point clouds.

When a marker is specified in one of the point clouds, the corresponding marker calculating part 140 identifies a corresponding marker in the other point cloud by using a relative relationship between the specified marker and another marker of the one of the point clouds. In this embodiment, a polygon or a polyhedron having each marker as an apex is generated in each of the point clouds. Then, the similarity or the correspondence relationship between the polygons or the polyhedrons of the point clouds is used to determine a marker in the other point cloud corresponding to a marker specified in the one of the point clouds.

The coinciding condition judging part 150 judges the condition for the above-described processing, that is, for forcing the markers to coincide on the display. The image display 160 may be a liquid crystal display equipped on or connected to the PC that implements the point cloud data processing device 100. The process controlling part 170 manages and executes the processing shown in FIGS. 8 and 9, which will be described later. The storage 180 stores various data, operation programs, and various data obtained as a result of the processing, used in the point cloud data processing device 100. The storage 180 may be implemented by a memory area of the PC or a hard disk unit.

Figure 8:
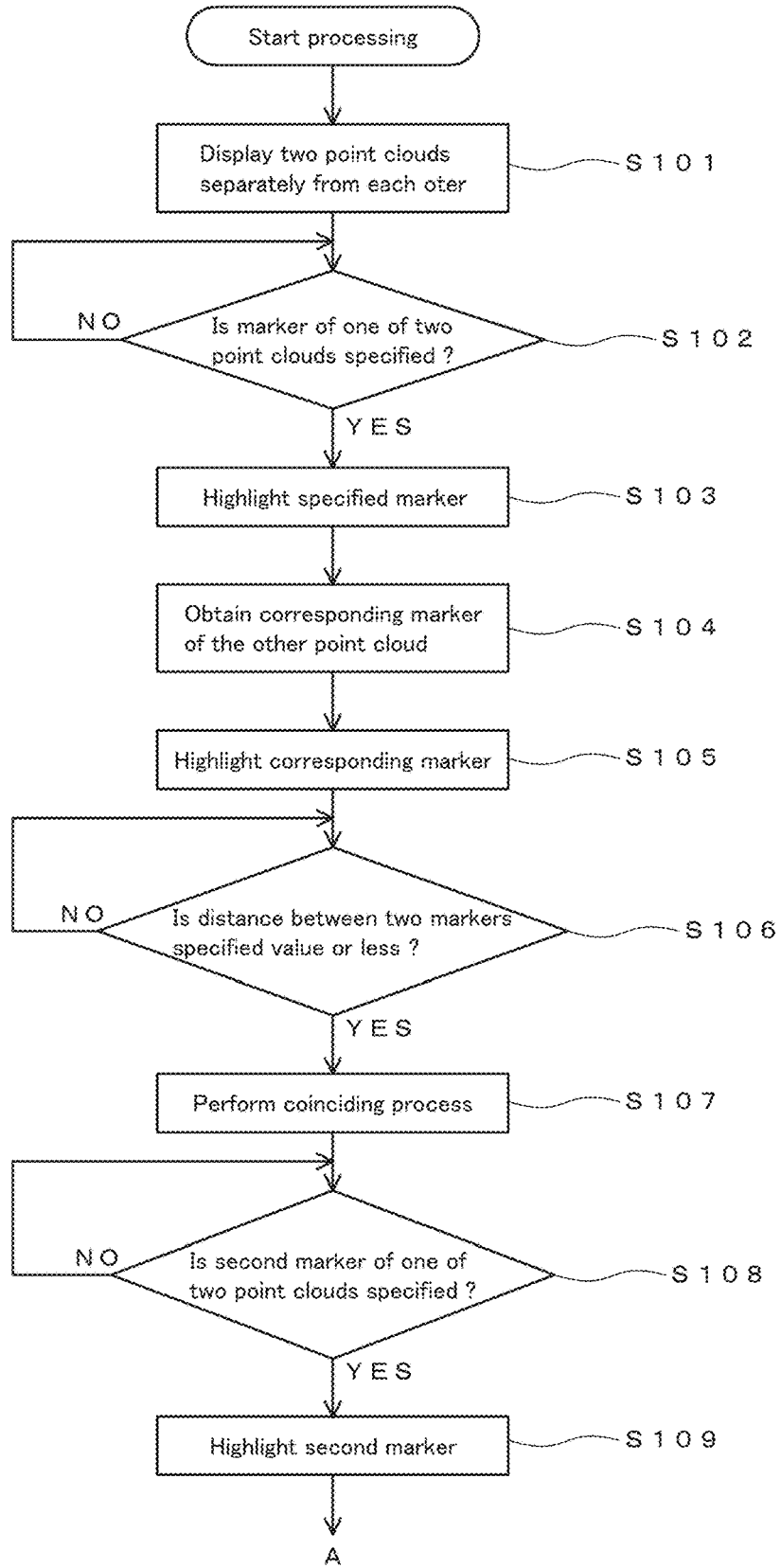
FIG. 8 is a flowchart showing an example of a processing procedure of an embodiment.
Figure 9:
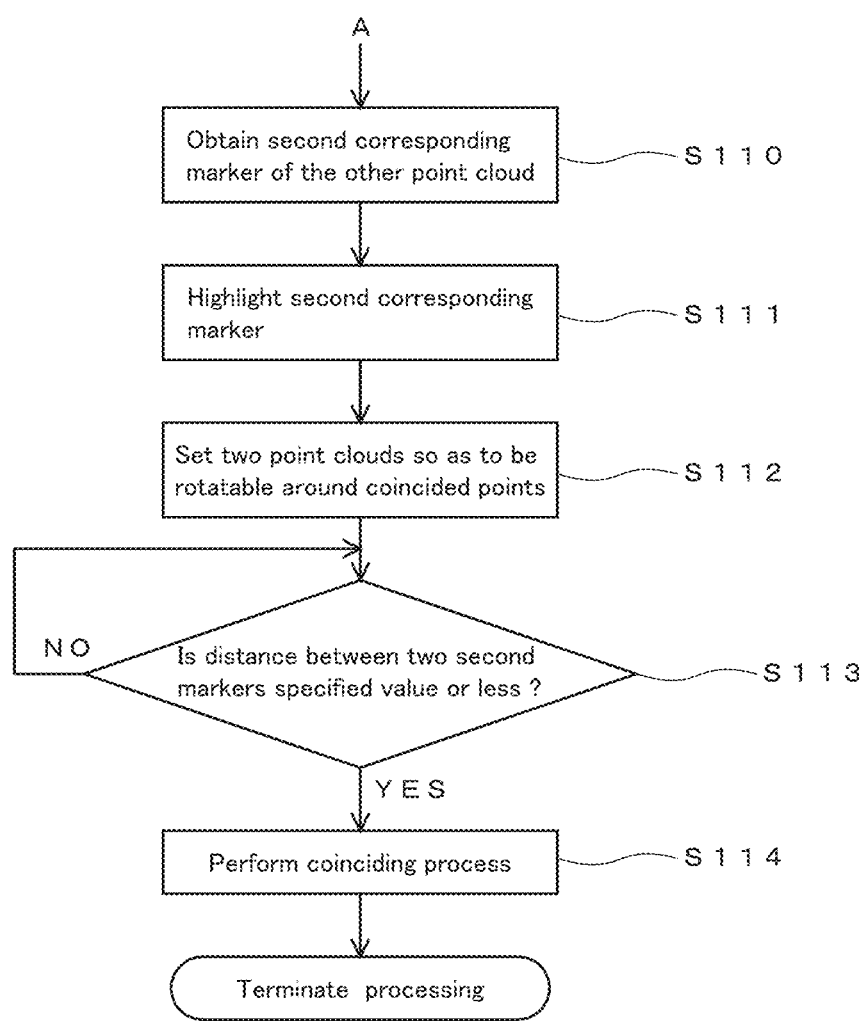
FIG. 9 is a flowchart showing the example of the processing procedure of the embodiment.

FIGS. 8 and 9 show flowcharts of an example of a procedure of the processing performed in the point cloud data processing device 100 in FIG. 7. Programs for executing the processing shown in FIGS. 8 and 9 are stored in the storage 180. These programs may be stored in an appropriate manner such as by using an identification medium or a server, and may be provided therefrom.

After the processing starts, first, two point clouds (first point cloud and second point cloud) are displayed separately from each other on a display as shown in FIG. 1 (step S101). The processing in this step is performed by the separation display controller 121. Next, when a user specifies a marker of one of the two point clouds, the processing advances from step S102 to step S103, and the specified marker is highlighted. For example, a marker 11 is displayed as shown in FIG. 2. The specification of the marker is received by the specified marker receiving part 110, and the highlighting is performed by the highlight controller 122.

Then, a marker of the other point cloud corresponding to the specified marker is obtained (step S104). For example, a marker 21 of the second point cloud corresponding to the marker 11 of the first point cloud specified by the user is obtained by using predetermined identification information (refer to FIG. 2). The processing in this step is performed by the corresponding marker obtaining part 130.

In a case in which the identification information prepared beforehand cannot be available, a polygon or a polyhedron having the markers as apexes is generated in each of the point clouds. Then, the correspondence relationship between the polygons or the polyhedrons is used to identify a marker of the other point cloud by the corresponding marker calculating part 140. Then, this marker of the other point cloud identified in calculation by the corresponding marker calculating part 140 is obtained as a marker of the other point cloud corresponding to the specified marker by the corresponding marker obtaining part 130.

After the corresponding marker (for example, the marker 21) is obtained, this marker is highlighted (step S105). The processing in this step is performed by the highlight controller 122. Next, one of the point clouds is brought close to the other point cloud by an operation by the user (refer to FIG. 3). Then, whether the corresponding markers of the two point clouds (for example, the markers 11 and 21) come close to each other so as to have a predetermined distance therebetween is judged (step S106). The processing in this step is performed by the coinciding condition judging part 150.

When the distance between the two corresponding markers is a predetermined value or less, one of the two markers is brought to the other marker so that the two markers are superposed by force one on another on the display (step S107). For example, the marker 11 may be brought to the marker 21, as shown in FIG. 3, to make the markers 11 and 21 coincide with each other. The processing in step S107 is performed by the coinciding processor 123. As a result of performing the processing in step S107, for example, the state shown in FIG. 5 is obtained. FIG. 5 shows a state in which a superposed marker 30 is obtained by making the markers 11 and 21 coincide with each other.

Next, the processing advances to step S108. When a second marker (for example, a marker 12 in FIG. 5) is specified by the user, the specified second marker is highlighted (step S109). The processing in this step is performed by the highlight controller 122.

Then, a marker of the other point cloud corresponding to the second marker highlighted in step S109 is obtained (step S110). For example, a marker 22 corresponding to the marker 12 is obtained. The processing in this step is performed by the corresponding marker obtaining part 130. As necessary, the corresponding marker calculating part 140 may identify a corresponding marker.

After the corresponding marker, for example, the marker 22 corresponding to the marker 12, is obtained, the corresponding marker is highlighted (step S111). Then, the state of the point clouds is shifted to a rotation operable state (step S112). In the rotation operable state, rotation can be performed around the markers that are already superposed one on another in step S107, for example, the superposed marker 30 generated by superposing the markers 11 and 21 one on another. The processing in this step is performed by the rotation display controller 124.

After one of the point clouds is rotated by the user as shown in FIG. 5, whether the distance between the target two markers on the display, for example, the markers 12 and 22 in FIG. 5, is a predetermined value or less is judged (step S113). When the distance is a predetermined value or less, the display positions of the two markers are brought close to each other to force them to coincide (step S114), and the processing is terminated. The judgment in step S113 is performed by the coinciding condition judging part 150, and the coinciding process is performed by the coinciding processor 123.

After a point cloud is obtained, a marker may be added to the point cloud. In this case, a marker is added to a point that is easy to discriminate as a feature point, such as of an edge of a building, in post-processing.

In the invention disclosed in this specification, to determine a corresponding marker of the other point cloud without using identification information when a marker is specified in one of the point clouds, a relative positional relationship between a specified marker and another marker of the one of the point clouds is used. The relative positional relationship is used by a first method or a second method, in addition to the method using a figure having markers as apexes as described in the above embodiment. The first method uses a distance between a target marker and another marker. The second method uses an angle formed between multiple straight lines connecting a target marker and other markers.

For example, the first method is described. First, it is assumed that two point clouds are obtained from the same object from different points of view, as shown in FIG. 1. It is also assumed that the two point clouds contain common markers M1, M2, and M3. The distance between the markers M1 and M2 is represented as a distance $L_{M1\text{-}M2}$, the distance between the markers M2 and M3 is represented as a distance $L_{M2\text{-}M3}$, and the distance between the markers M1 and M3 is represented as a distance $L_{M1\text{-}M3}$. In this condition, the relative relationship of the marker M1 to the other markers is defined as $L_{M1\text{-}M2}+L_{M1\text{-}M3}$. Similarly, the relative relationship of the marker M2 to the other markers is defined as $L_{M1\text{-}M2}+L_{M2\text{-}M3}$. Also, the relative relationship of the marker M3 to the other markers is defined as $L_{M1\text{-}M3}+L_{M2\text{-}M3}$.

Typically, a triangle having the markers M1 to M3 as apexes is not a regular triangle and not an isosceles triangle, and therefore, the values "$L_{M1\text{-}M2}+L_{M1\text{-}M3}$", "$L_{m1\text{-}M2}+L_{M2\text{-}M3}$", and "$L_{M1\text{-}M3}+L_{M2\text{-}M3}$" are not the same. Thus, the marker M1 is characterized by the value "$L_{M1\text{-}M2}+L_{M1\text{-}M3}$" and can be discriminated from the other markers. Similarly, the marker M2 is characterized by the value "$L_{M1\text{-}M2}+L_{M2\text{-}M3}$" and can be discriminated from the other markers. Also, the marker M3 is characterized by the value "$L_{M1\text{-}M3}+L_{M2\text{-}M3}$" and can be discriminated from the other markers.

On the basis of this principle, by extracting a marker that is characterized by the value "$L_{M1\text{-}M2}+L_{M1\text{-}M3}$" from each of the point clouds, a marker M1 of one of the point clouds is made to correspond to a marker M1 of the other point cloud. Similarly, by extracting a marker that is characterized by the value "$L_{M1\text{-}M2}+L_{M2\text{-}M3}$" from each of the point clouds, a marker M2 of one of the point clouds is made to correspond to a marker M2 of the other point cloud. Also, by extracting a marker that is characterized by the value "$L_{M1\text{-}M3}+L_{M2\text{-}M3}$" from each of the point clouds, a marker M3 of one of the point clouds is made to correspond to a marker M3 of the other point cloud.

The first method and the second method may be used together to characterize markers of point clouds. In this case, for example, under the above assumption, a line segment connecting the markers M1 and M2 is represented as a line segment $L_{M1\text{-}M2}$ and a line segment connecting the markers M1 and M3 is represented as a line segment $L_{M1\text{-}M2}$. The value "$L_{M1\text{-}M2}+L_{M1\text{-}M3}$" and an angle AO formed between the line segment $L_{M1\text{-}M2}$ and the line segment $L_{M1\text{-}M3}$ are used as parameters that characterize the marker M1. The combination of the value "$L_{M1\text{-}M2}+L_{M1\text{-}M3}$" and the angle AO is specific to the marker M1. On the basis of this function, by searching for a marker having a combination similar to the combination for the marker M1 from the other point cloud, the marker M1 of one of the point clouds and the marker M1 of the other point cloud are made to correspond with each other.

The point of view for describing two point clouds is not limited to the point for downwardly viewing in the vertical direction. For example, two point clouds may be viewed downwardly from an oblique direction at an angle, such as one of 45 or 60 degrees. Then, the two point clouds in this state may be displayed on a display and are set to be movable in parallel and be rotatable around an axis in the vertical direction. In this example, also, the processing is performed as in the case described above. That is, a marker 1 of one of the two point clouds is specified, a corresponding marker 1' of the other point cloud is identified, the marker 1 is moved to the marker 1', and the marker 1 is the marker 1' in a condition in which the markers 1 and 1' are close to each other. Then, a marker 2 of one of the two point clouds is specified in a condition in which the markers 1 and 1' coincide with each other, the one of the two point clouds is rotated around the coincided markers 1 and 1' by moving the marker 2, and the marker 2 is brought to the marker 2' of the other point cloud corresponding to the marker 2.

When the scales of the two point clouds do not agree with each other, the scale of one of the point clouds is changed, and the scale is adjusted by force in the final state. In this case, the configuration in FIG. 7 further includes a forced scale adjusting part, and the following processing is performed.

In the exemplary case shown in FIGS. 1 to 6, if the scales of the first point cloud and the second point cloud do not agree with each other, the markers 12 and 22 do not coincide with each other when the first point cloud is rotated in the state in FIG. 5. In such a case, when the first point cloud is rotated, the scale of the first point cloud is forced to change at a stage in which the markers 12 and 22 come closest to each other.

For example, at a stage in which the markers 12 and 22 come closest to each other, the scale of the second point cloud is increased. Then, if the distance between the markers 12 and 22 is increased, conversely, the scale of the second point cloud is reduced to make the markers 12 and 22 coincide with each other on the display. Otherwise, at a stage in which the scale of the second point cloud is enlarged, if the distance between the markers 12 and 22 is decreased, the enlargement is continued to make the markers 12 and 22 coincide with each other on the display. In another case, when the markers 12 and 22 do not coincide with each other on the display only by increasing scale or reducing scale, the forced rotation of the second point cloud is also performed to try to make the markers 12 and 22 coincide with each other.

FIGS. 10 to 16 show images of point clouds respectively displayed on a display of a PC. FIGS. 10 to 16 respectively show a state of the point clouds as viewed downwardly from the vertical direction.

Figure 10:
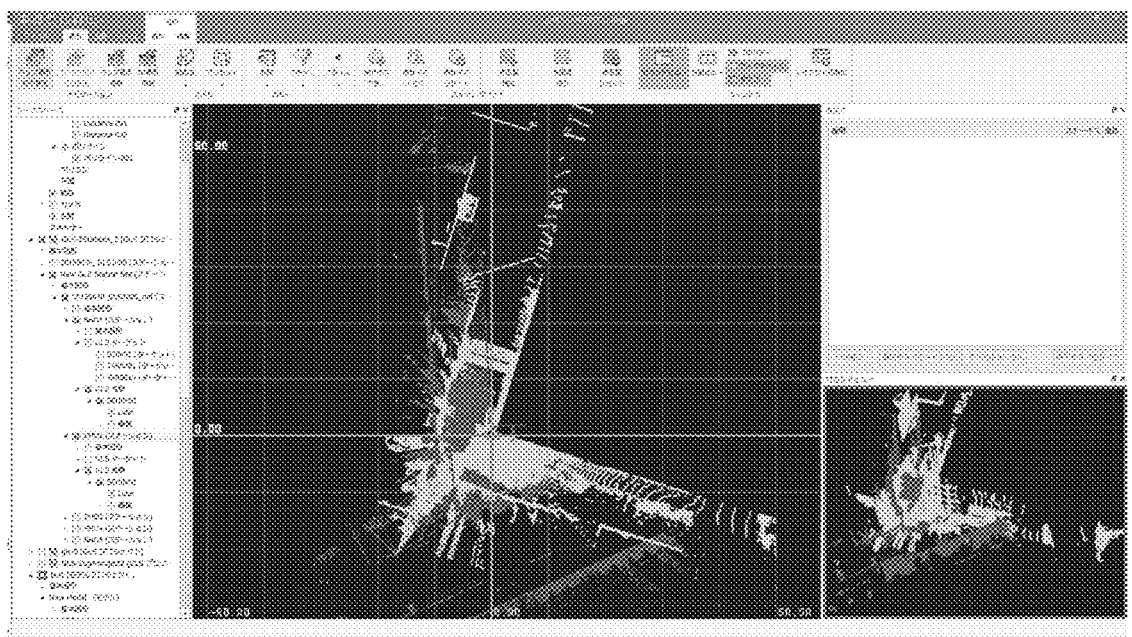
FIG. 10 shows an example of a displayed screen.
Figure 11:
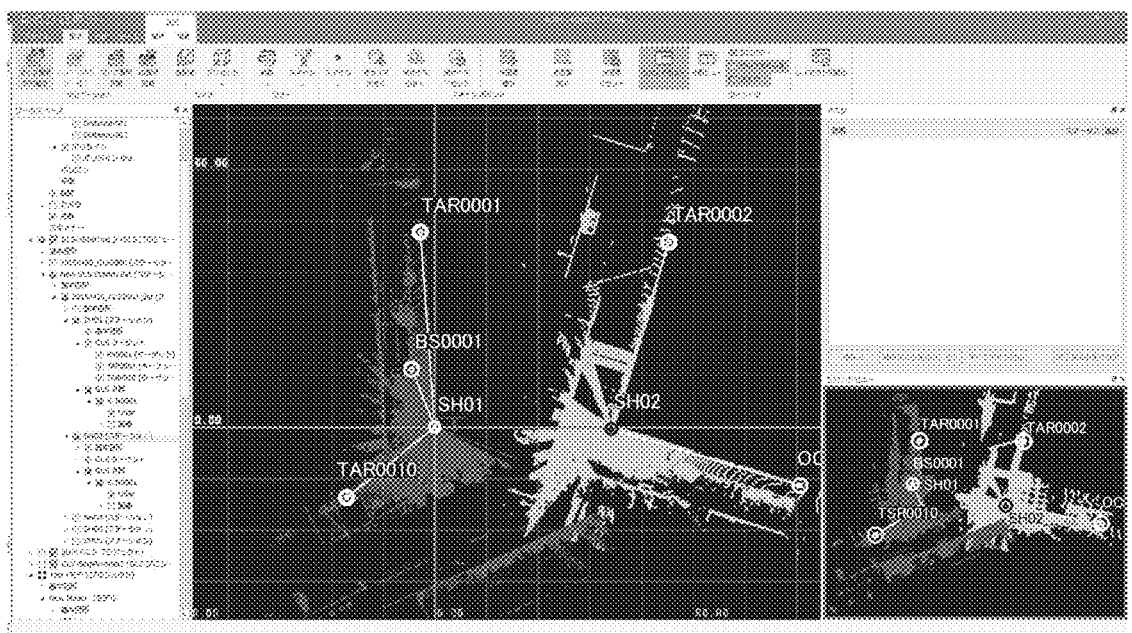
FIG. 11 shows an example of a displayed screen.
Figure 12:
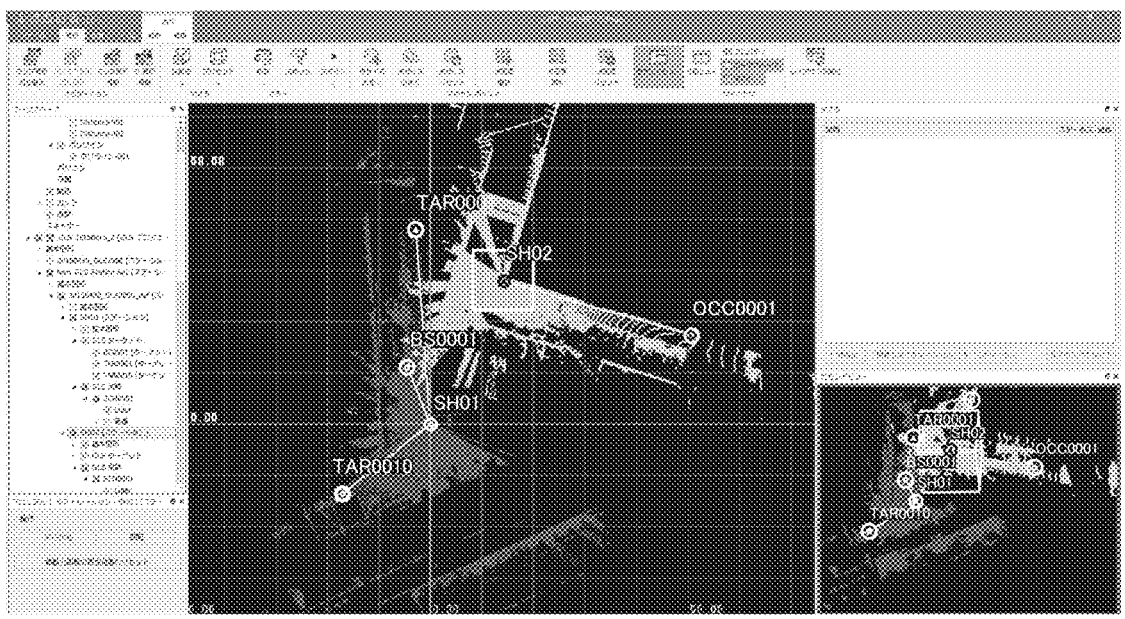
FIG. 12 shows an example of a displayed screen.

FIG. 10 shows a state in which two point clouds are displayed in a superposed manner FIG. 11 shows a state in which two point clouds are displayed separately from each other. FIG. 12 shows a state after the following processing is performed. That is, a marker SH02 of a light gray-colored point cloud at an upper side is specified, and the light gray-colored point cloud is moved in parallel. The marker SH02 and a corresponding marker TAR0001 are high-lighted. The marker TAR0001 is a marker of a dark gray-colored point cloud and is displayed at a lower side.

Figure 13:
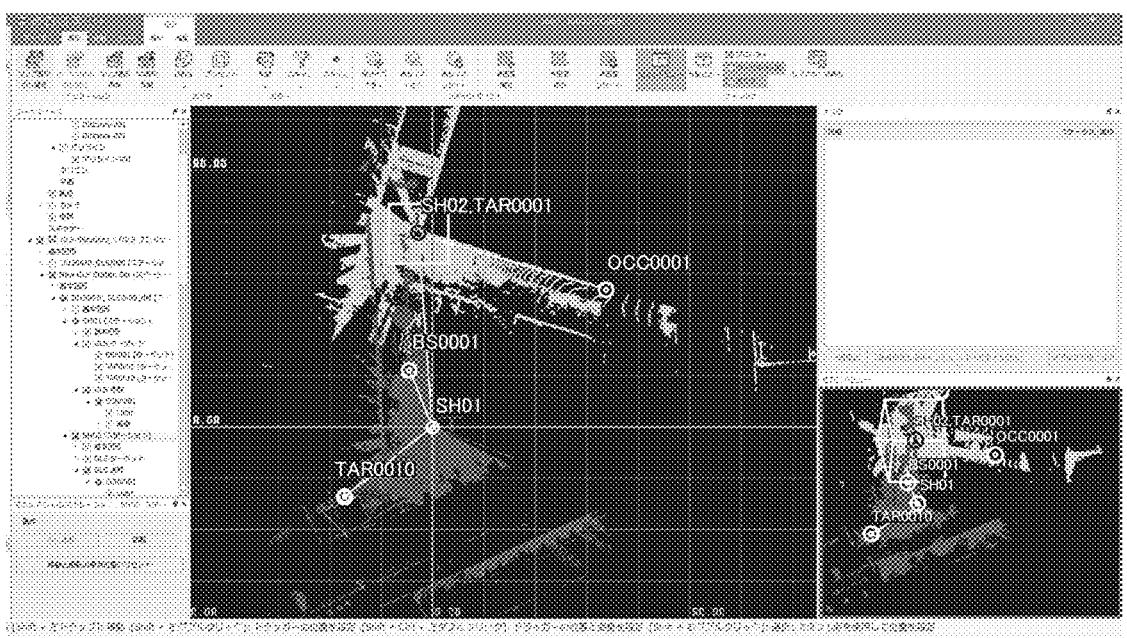
FIG. 13 shows an example of a displayed screen.
Figure 14:
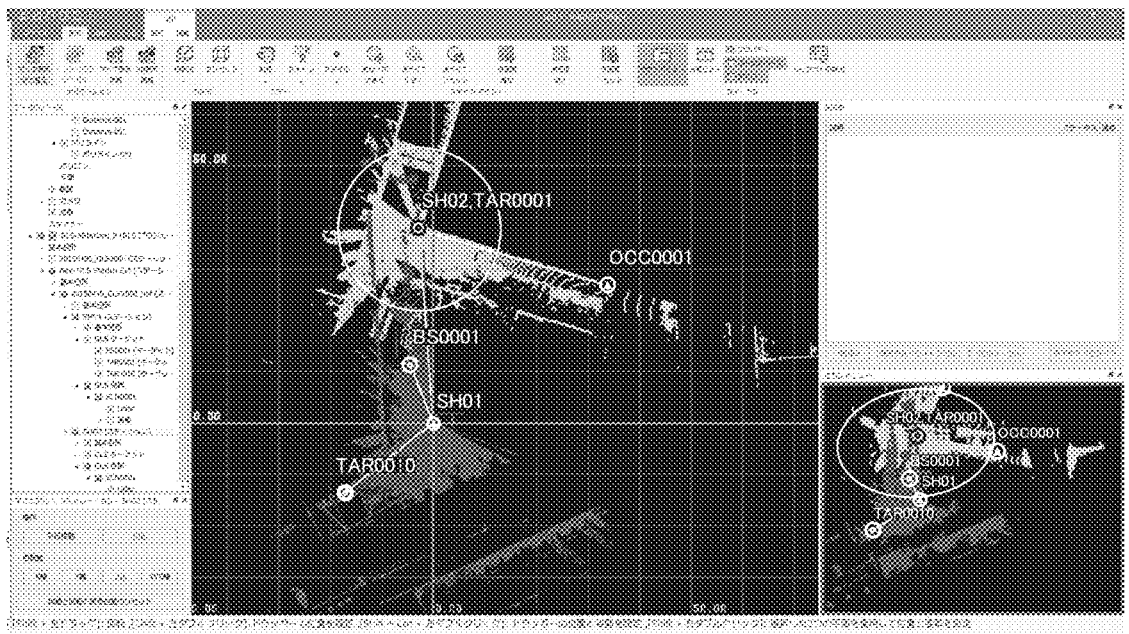
FIG. 14 shows an example of a displayed screen.

FIG. 13 shows a state in which the marker SH02 of the light gray-colored point cloud and the marker TAR0001 of the dark gray-colored point cloud are made to coincide with each other on the display. FIG. 14 shows a state in which a second marker OCC0001 is specified from among those in the light gray-colored point cloud by clicking and capturing. In this state, a marker SH01 of the other point cloud (dark gray-colored point cloud) corresponding to the marker OCC0001 is identified.

Figure 15:
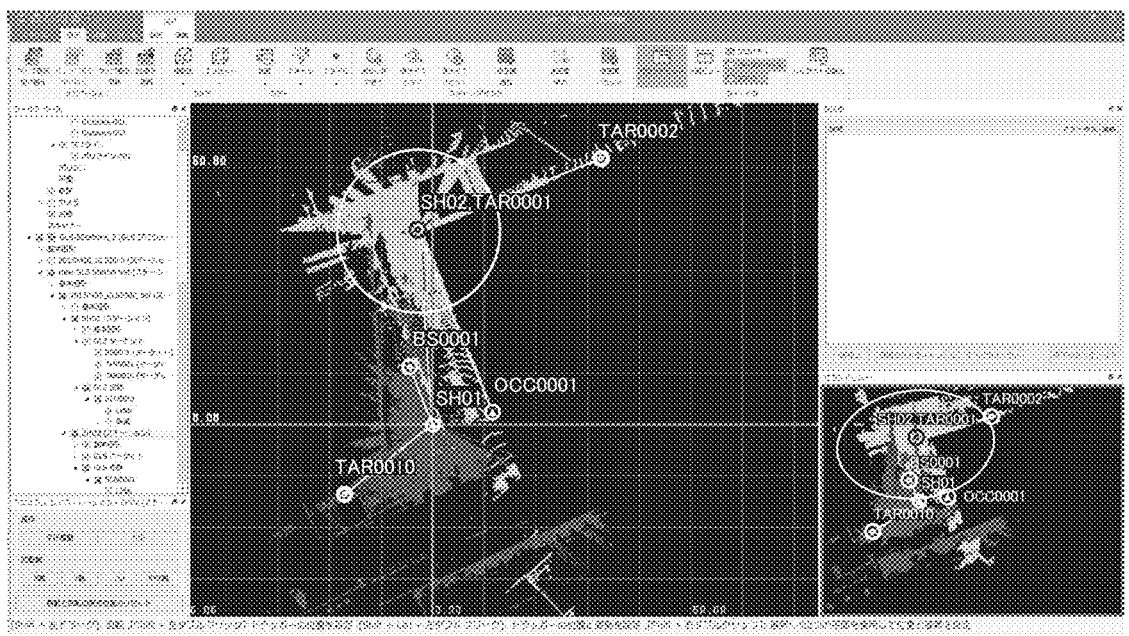
FIG. 15 shows an example of a displayed screen.
Figure 16:
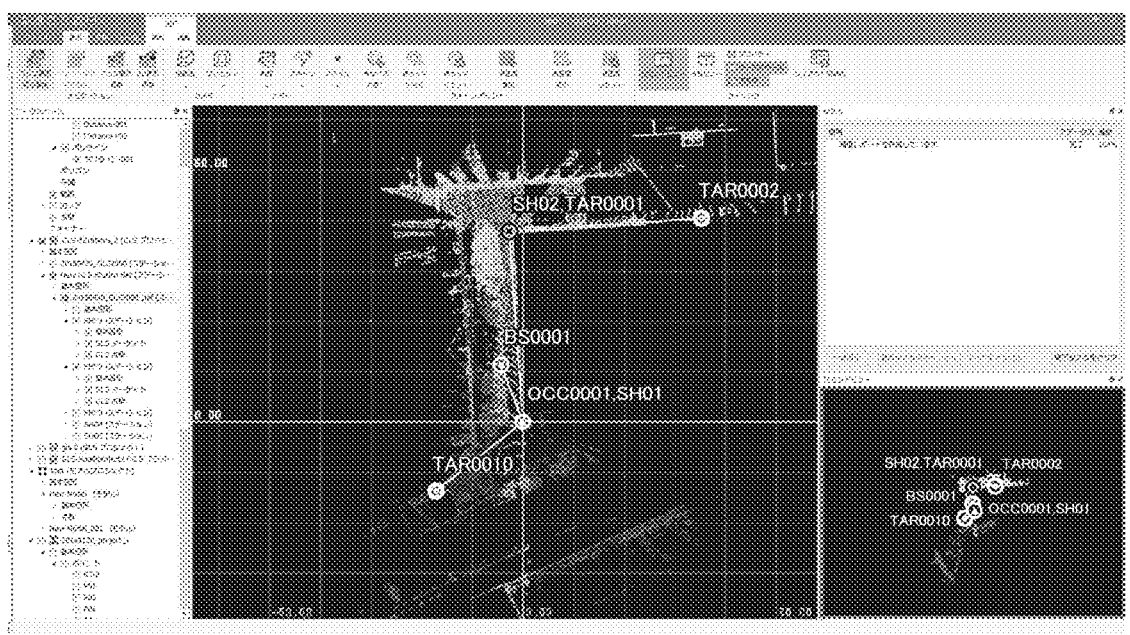
FIG. 16 shows an example of a displayed screen.

FIG. 15 shows a state in which the light gray-colored point cloud is rotated in a clockwise direction from the state in FIG. 14 to make the marker OCC0001 closer to the marker SH01. FIG. 16 shows a state in which the marker OCC0001 coincides with the marker SH01 and the light gray-colored point cloud that was displayed at the upper side coincides with the dark gray-colored point cloud that was displayed at the lower side.

What is claimed is:

1. A point cloud data processing device comprising:
a highlight controlling part that, in a condition in which a first point cloud containing multiple markers for position matching and a second point cloud containing multiple markers for position matching are displayed on a display, when one of the multiple markers of one of the first point cloud and the second point cloud is specified as a first marker, highlights a corresponding marker among the multiple markers of the other point cloud as a second marker
a corresponding marker calculating part that, when a marker is specified among the multiple markers of one of the first point cloud and the second point cloud, calculates a corresponding marker among the multiple markers of the other point cloud,
wherein the corresponding marker calculating part identifies the corresponding marker on the basis of a relative positional relationship between the specified marker and at least one of the multiple markers of the one of the first point cloud and the second point cloud.

2. The point cloud data processing device according to claim 1, further comprising:
a rotation display controlling part that controls, at a stage in which the first marker and the second marker are made to coincide with each other on the display, rotation of the first point cloud or the second point cloud around the first marker or the second marker on the display.

3. The point cloud data processing device according to claim 1, further comprising:
a coinciding processing part that, when a distance between the first marker and the second marker is a predetermined value or less on the display, executes processing for making the first marker and the second marker coincide with each other on the display.

4. The point cloud data processing device according to claim 1, wherein the relative positional relationship is determined by using a figure having the specified marker and the at least one of the multiple markers of the one of the first point cloud and the second point cloud as apexes.

5. The point cloud data processing device according to claim 1, wherein the relative positional relationship is determined by a distance between the specified marker and the at least one of the multiple markers of the one of the first point cloud and the second point cloud.

6. The point cloud data processing device according to claim 1, further comprising:

a separation display controlling part that displays the first point cloud and the second point cloud separately from each other.

7. A point cloud data processing method comprising:
in a condition in which a first point cloud containing multiple markers for position matching and a second point cloud containing multiple markers for position matching are displayed on a display, when one of the multiple markers of one of the first point cloud and the second point cloud is specified,
highlighting a corresponding marker among the multiple markers of the other point cloud;
when a marker is specified among the multiple markers of one of the first point cloud and the second point cloud, calculating a corresponding marker among the multiple markers of the other point cloud, and
identifying the corresponding marker on a basis of a relative positional relationship between the specified marker and at least one of the multiple markers of the one of the first point cloud and the second point cloud.

8. A non-transitory computer recording medium storing computer executable instructions that, when executed by a computer processor, cause the computer processor to:
operate as a highlight controlling part that, in a condition in which a first point cloud containing multiple markers for position matching and a second point cloud containing multiple markers for position matching are displayed on a display, when one of the multiple markers of one of the first point cloud and the second point cloud is specified, highlights a corresponding marker among the multiple markers of the other point cloud;
when a marker is specified among the multiple markers of one of the first point cloud and the second point cloud, calculating a corresponding marker among the multiple markers of the other point cloud, and
identifying the corresponding marker on a basis of a relative positional relationship between the specified marker and at least one of the multiple markers of the one of the first point cloud and the second point cloud.

* * * * *

UNITED STATES PATENT AND TRADEMARK OFFICE
CERTIFICATE OF CORRECTION

PATENT NO. : 10,810,699 B2
APPLICATION NO. : 15/905887
DATED : October 20, 2020
INVENTOR(S) : Takahiro Komeichi et al.

It is certified that error appears in the above-identified patent and that said Letters Patent is hereby corrected as shown below:

In the Specification

Column 11, Line 19, "and the marker 1 is the marker 1' in a condition" should read --and the marker 1 is pulled to the marker 1' in a condition--

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*